ROTATING HEAD AND DISC MAGNETIC RECORDING SYSTEM

Filed Nov. 24, 1965 3 Sheets-Sheet 1

Inventor:
ABRAHAM LICHOWSKY
BY Samuel Cohen
Attorney

Inventor:
ABRAHAM LICHOWSKY
BY Samuel Cole
Attorney

Inventor:
ABRAHAM LICHOWSKY
BY Samuel Cohen
Attorney

United States Patent Office 3,402,403
Patented Sept. 17, 1968

3,402,403
ROTATING HEAD AND DISC MAGNETIC RECORDING SYSTEM

Abraham Lichowsky, Los Angeles, Calif., assignor to Radio Corporation of America, a corporation of Delaware Filed Nov. 24, 1965, Ser. No. 509,497
19 Claims. (Cl. 340—174.1)

ABSTRACT OF THE DISCLOSURE

A disc memory in which both the storage disc and head rotate. They rotate in parallel planes and around axes which are offset from one another. The tracks on the storage disc are of curved shape and extend from the outer portion toward the inner region of the storage disc or vice versa. Identification marks may be recorded along the disc circumference to indicate the track positions and identification marks may be recorded along the circumference of a second disc to which the head may be fixed to indicate the head position. A control system may be employed to regulate the speed and phase of one disc relative to the other.

Electromechanical memory systems employing magnetic tapes with longitudinal tracks, or discs with circular tracks, or drums, have important applications as storage devices for binary data. While of relatively low speed and relatively long average access time compared to all electronic memories such as magnetic core memories, the electromechanical systems do have the important advantage that they can store relatively large amounts of data at a relatively low per bit cost.

The amount of data a given storage area of an electromechanical memory system can accommodate depends, in part, upon the minimum separation which is possible between adjacent data storage tracks and the width of each track. Because of the effects of wear, environmental changes and cumulative mechanical tolerances, among other things, there is, as a practical matter, a lower limit on track width and track spacing. In conventional disc memories, for example, the tracks may be 0.005 inch wide and spaced 0.008 inch from one another (center to center).

To achieve reliable operation of a memory system with such narrow tracks and spacing requires complex and precise mechanisms to insure proper positioning of the read/write heads over the recorded tracks. Minute amounts of angular (azimuth) misalignment of a head relative to its track or lateral shifts (shifts in a direction perpendicular to the recording direction) of the head, impair the performance of the system.

The width dimension (0.005 inch) of the tracks discussed above is relatively large compared to the shortest wavelengths employed in high linear density digital recording. Still, recorded higher frequency signal components are lost when the amount of angular misalignment between a head and track approaches the equivalent wavelengths of these higher frequency components. Narrower tracks and spacing are not practical in the conventional storage systems discussed above because a slight degree of lateral misalignment between a head and track causes a substantial loss of signal and a substantial decrease in signal-to-noise ratio. The reason is that the fringing magnetic fields due to the longer wavelengths recorded on adjacent tracks simultaneously are read out and interfere with one another.

Because of the interdependence of the parameters discussed above, the design of a conventional disc or similar memory normally follows one of two different approaches. The first is to control the head alignment with the track by ultra high precision mechanisms. The other is to increase the track widths to obtain strong signals; to make proportional bandwidth reduction (to eliminate some of the shorter wavelengths of the signal to be recorded); and to increase the track spacing to avoid the interference created by the longer wavelength signals recorded on adjacent tracks. Neither of these approaches is particularly attractive.

A general object of this invention is to provide a memory in which information may be densely packed and which has relatively large storage capacity.

Another object of the invention is to provide a disc memory which is relatively simple mechanically, which is highly reliable and which is relatively low in cost.

Another object of the invention is to provide a disc memory which is capable of very high bit packing density.

Another object of the invention is to provide a memory in which the recording tracks may be spaced very closely but in which neither reciprocating mechanisms nor mechanical detent devices are needed for very precisely locating and following the tracks.

One embodiment of a memory system of the invention includes two rotating discs, the first, known as an information disc, stores data and the second, known as a head disc, has recorded thereon indications from which the position of a transducer, such as a magnetic head, may be determined. One or more transducers rotate with and may be fixed to the last-named disc. The two discs rotate in parallel planes and the information storage tracks extend in an approximately spiral path from the outer portion toward the center region of the information disc, or vice versa.

The precise location of each track on the information disc may be determined from track identification indications recorded on the information storage disc as, for example, at or near its outer edge. The angular location of the transducer or transducers may be determined from the indications recorded on the head disc.

The two discs may be driven continuously at their desired average operational speeds. These speeds may be measured by determining the frequency of timing signals derived from timing indications recorded on the discs. Any desired phase relationship between the two discs may be obtained by causing the drive means for one of the discs temporarily to increase or decrease its speed relative to the drive means for the other disc until the two discs approach the desired phase relationship, then rapidly returning the variable speed disc to its nominal speed and re-establishing phase lock at the desired relative phase angle.

The relative phase of one disc with respect to the other is measured by comparing an address code derived from the track identification indications (this code also defines the track position) read from the information disc with the address code derived from the transducer position indications read from the head disc. A desired track on the information disc may be located by comparing an address code for that track with the address code derived from the track identification indications on the disc.

Other embodiments of the invention employ a single drive means for both discs and require no code recorded on the head disc nor complex control systems for adjusting the relative phases of the discs. These are discussed in detail below.

The invention is discussed in greater detail below and is shown in the following drawings of which:

Figures 1, 3:
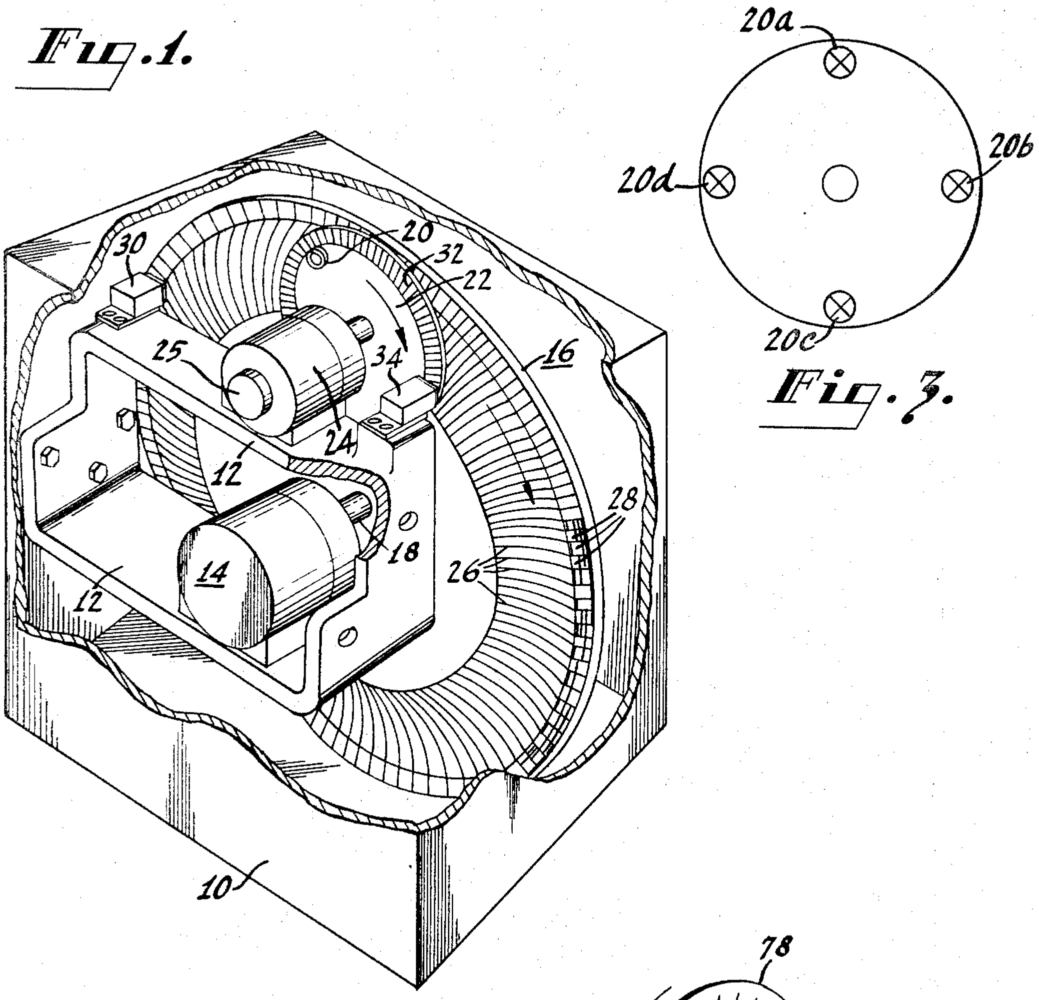
FIGURE 1 is a broken away, perspective view of one embodiment of a memory according to the invention.
FIGURE 3 is a schematic showing of a modified form of headwheel for a disc memory system according to the invention.

The embodiment of the invention shown in FIGURE 1 includes a housing 10 to which is fixed a mounting bracket 12. A motor 14 is secured to the bracket and the information storage disc 16 is fixed at its center to the motor shaft 18.

The transducer (read/write head) 20 is mounted in a second disc 22 which is parallel and immediately adjacent to the information storage disc 16. The transducer can instead be fixed to the shaft on which the second disc is mounted. The head disc 22 is driven by a motor 24 which is also fixed to the bracket 12. The leads (not shown) for the read/write head pass through the shaft of motor 24 and are available, via rotary coupler 25, for coupling to the read/write circuits (not shown), which may be in a separate stationary chassis (not shown).

In the operation of the disc memory of FIGURE 1, both the information storage disc 16 and the head disc 22 continuously rotate. The head disc preferably rotates at a substantially higher speed than the information storage disc, representative speeds being 2400 r.p.m. for the information storage disc and 4800 r.p.m. for the head disc (other examples are given later). At these speeds, the head 20 records information on the storage disc along tracks 26 which extend in a generally radial direction with respect to the center of the disc. The paths traced by the tracks are curved (their shape approximates that of a portion of a spiral), the direction and amount of curvature of the tracks being a function of the relative speeds of the two discs, the relative sizes of the two discs, and the relative directions of the disc rotation. In the embodiment shown, both discs rotate in the same direction but they may instead rotate in opposite directions. Moreover, in each case, information may be written on the disc in the direction from the outer edge toward the center of the disc or vice versa.

The radial dimension of the recording band (the band in which the tracks occur) which is chosen in any particular design depends upon a number of factors. These include the size of the information recording disc, the relative speed of the recording head as it moves along the track, and so on. The smaller the inner diameter of the recording band, the greater the track curvature and it is undesirable to have an excessive amount of track curvature. On the other hand, the smaller the inner diameter, the longer the tracks it is possible to record, but the fewer the tracks that may be recorded. Fewer tracks may be recorded because they get closer and closer together as the tracks approach the center of the disc. A compromise is reached at some point at which maximum surface utilization efficiency is achieved.

Each track on the information storage disc may be identified by a multiple bit binary number. This number may be recorded in two different places on the track. First the code may be recorded at the outer portion 28 of the track (or, alternatively, along a circular zone near the inner boundary of the track) for purposes of track identification. As discussed shortly, this code may be read by the fixed heads 30. Secondly, this code may be recorded at the beginning of each track (the beginning of a track may be that portion of the track closest to the center region of the track or closest to the outer region of the track, depending upon the reading direction) for purpose of verifying that the head 20 is at the track that it is supposed to be at. This latter code, known as a "track verification" code, is read by the moving head 20.

The track identification codes may be read, in parallel, by a group of heads 30 which are mounted on bracket 12. In the particular example given here in which each code has 14 bits, the group of heads 30 may contain 14 heads for direct readout. As an alternative, the code may consist simply of a single identification mark (a clock signal) per track and a start mark which occurs once each disc revolution. The start mark and identification marks may be applied to a counter and the counter output then decoded to identify the track and track position corresponding to each count. An arrangement of this type is discussed in greater detail later.

Means are also provided in the memory of the invention for monitoring the instantaneous position of the head disc 22. These means include multiple bit binary code indications recorded around one of the head disc faces, as shown schematically at 32, and a group of heads 34 mounted on the bracket 12 for reading these binary indications. In one particular system, each number manifested by a group of indications may be a 13 bit binary code and the structure 34 may contain 13 heads. Here, as in the case of the information storage disc, other coding schemes are possible.

In the arrangement shown in FIGURE 1, because the track identification codes are recorded directly on the data recording medium, it is possible to locate and align the head precisely with the tracks by electronic means, permitting very close spacing of the tracks. For example, the tracks may be packed at a density of 300 or more tracks per inch and, using modern recording techniques, the bits may be recorded along each track at a density of over 2000 bits per linear inch. Thus, surface packing densities in excess of $6 \times 10^5$ bits per square inch are feasible. Using an information storage disc 16 having a diameter of 12 inches, a head disc having a diameter of about 5 inches, and recording information on only the outer 2½ inches or so of the disc, provides a total of over 6000 tracks at the assumed packing density of 300 tracks per inch. The total number of bits which can be stored on such a disc is approximately 6000 tracks x 5 inches per track x 2000 bits per inch$=60 \times 10^6$ bits. (Note that the tracks, although lying in a zone with a 2½ inch radial dimension, are curved, are at an angle to the radii, and are about 5 inches long.)

The motor 14 in FIGURE 1 is preferably one that rotates at a constant speed such as, for example, a synchronous motor. The motor 24 is driven from the same power source as the motor 14 and its speed is synchronous with that of motor 14.

When it is desired to access a particular track on the disc 16, the address for that track is compared with the address read by the read/write heads 30. At the same time, the relative position of the head disc 22 is monitored. The control circuit (to be described shortly) either speeds up or slows down the motor 24 with respect to its normal rotational speed to insure that the read/write head 20 is positioned at the fixed starting position for any selected track when that track is centered over the "read-write commence" position. The "read-write commence" position is defined as the intersection point between the circle defining the starting points of all the tracks on the recording disc and the circle traced by the center of the read/write head recording gap as it moves over the disc. The assumption made in this particular case is that reading or writing occurs during the movement of the head from the outer portion to the inner portion of the information storage disc 16. As already mentioned, the opposite direction for reading and writing is also possible.

Figure 2:
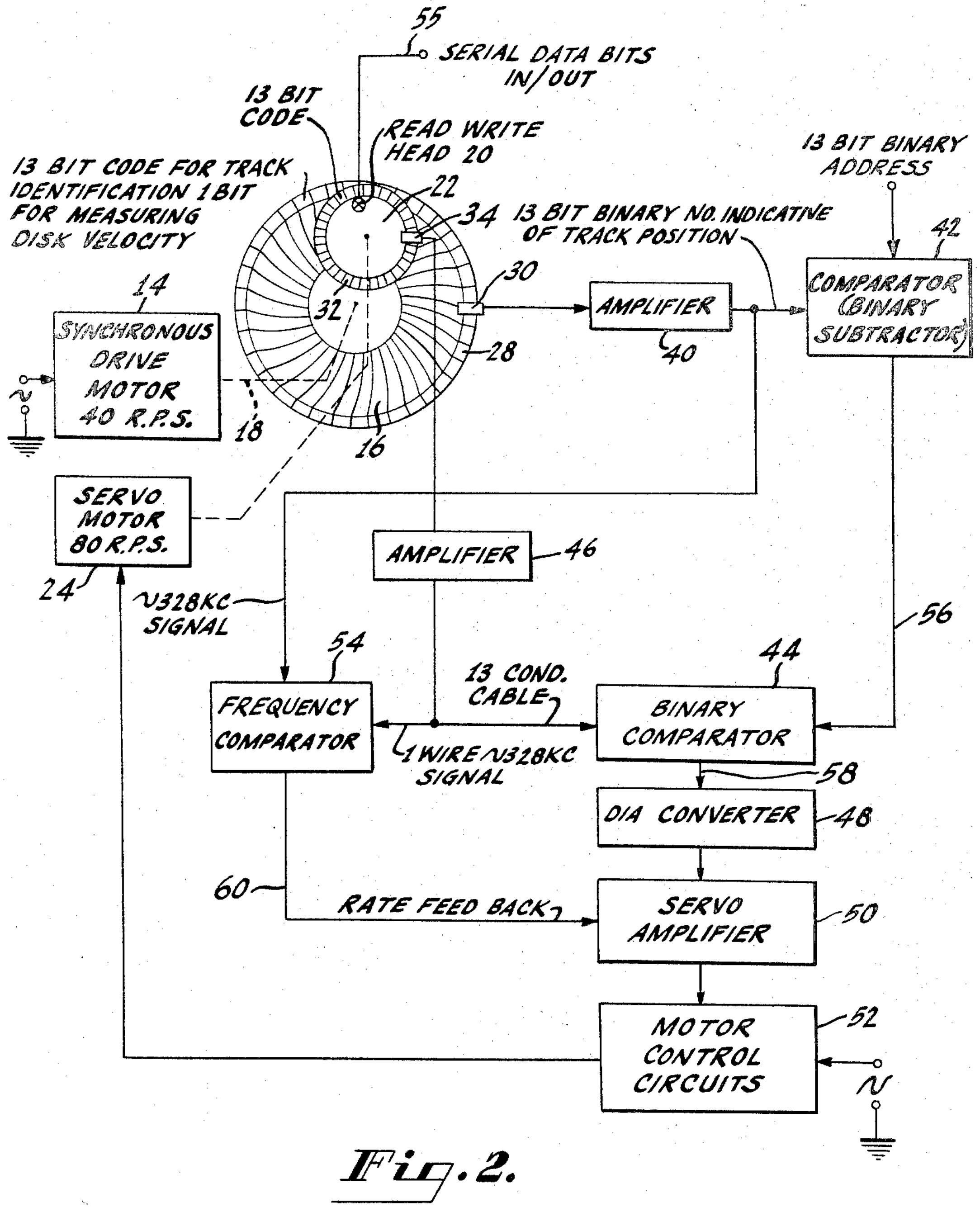
FIGURE 2 is a block diagram of a control system for the disc memory system of the invention.

FIGURE 2 is a simplified block diagram of one form of control system for the disc memory of FIGURE 1. The 13 bit track identification code signals read from the information storage disc 16 are applied by the read heads 30, via amplifier 40, to the comparator 42. The second input to the comparator is a 13 bit binary address supplied by the data processing system (not shown) of which the disc memory of the present invention may be a peripheral equipment. This 13 bit binary address identifies the track on which it is desired to write or from which it is desired to read.

The comparator 42 may be a binary subtractor of known design and it produces at its output a binary number indicative of the instantaneous angular displacement of the desired track from the proper position for commencing a read or write operation. This binary number serves as one input to a binary comparator 44. The second input to the binary comparator 44 is a 10 bit binary code read from the head disc 22 by the heads 34. This binary code is applied to the comparator through amplifier 46 and represents the instantaneous angular displacement of the read/write head from the proper position for commencing a read or write operation.

The output of the binary comparator 44 represents the dynamic phase error of the read/write head with respect to the angular position of the desired track on the recording disc and is applied to a digital-to-analog converter 48. The analog signal produced by the converter is applied to a servo amplifier 50 which controls the head disc motor in such a manner as to minimize this phase error and thus insure that both the desired track and read/write head arrive at the "read-write commence" position simultaneously and in phase lock. A second input to the servo amplifier is a rate or velocity feedback signal, as discussed shortly.

The servo amplifier connects to the motor control circuits 52. The latter, which are driven by the same alternating current source as controls the synchronous drive motor 14, controls the operating speed of the servo motor 24. The servo amplifier signal may cause the motor control circuits 52 to speed up or to slow down the servo motor in order properly to phase the rotation of the head disc 22 with that of the information storage disc 16, as is discussed shortly. As an alternative, the signal may cause a momentary change in speed in only one sense, for example, in the slow down direction, until a proper phase relationship is achieved. This method of control is somewhat simpler and more economical than that of the former method but access time is slightly increased. With either method, when the two tracks are locked in the proper phase, the servo motor returns to its normal speed which, in the example given above, is exactly double that of the synchronous motor speed.

The 14th (least significant) bit of the binary code 28 on the information storage disc 16 may also be used for the purpose of producing an output clock signal indicative of the information storage disc angular velocity. This last bit may alternate in value between 1 and 0. In the example given, the velocity is 2400 r.p.m. or 40 r.p.s. (revolutions per second). Assuming the total number of information storage tracks is $8192=2^{13}$, the total number of track position identification binary code numbers which are possible is 16384, then each alternate number (address) will identify the proper center position of a recording track. In the present arrangement, by way of example, if a clock pulse is produced each time the last (14th) bit has the value 1, that is, one clock pulse per track, 8192 clock pulses are produced per disc revolution or 327,680 pulses per second.

The head disc 22 may have a total of 8192 binary code numbers recorded around its circumference. The 13th bit (least significant) of the code may alternate between values 1 and 0 and may be used for the purpose of generating a signal indicative of the head disc 22 velocity. A pulse may be generated each time the signal picked up by the read head for that bit indicates a recorded binary "1" thus generating a frequency of 4096 pulses per disc revolution$\times$80 r.p.s.=327,680 pulses per second. This is exactly the same frequency as produced by the corresponding pulses recorded on the disc 16. These two signals, that is, the 327.68 kc. signal from the head disc and the 327.68 kc. signal from the information storage disc, are applied to a frequency comparator 54 and the analog signal produced by the comparator is used as the rate feedback signal applied to the servo amplifier 50. Appropriate circuits for limiting and shaping the two 327.68 kilocycle signals may be present in the comparator 54.

In the operation of the control system of FIGURE 2, the comparator 42 produces a binary number indicative of the instantaneous angular difference between the actual track position and the common read/write position for all the tracks. The amplifier 46 produces a binary number indicative of the instantaneous angular difference between the actual position of the head and the fixed reference ("read/write commence") position of the head. The reference position of the head, as previously defined, is its position at the start of a read/write track. The output of the binary comparator 44 is a binary number indicative of any phase adjustment which must be made between the two discs in order to insure that the read/write head will cross over the start of the track ("read/write commence" position) when the desired track moves into the read/write zone (beginning at the "read/write commence" position). This number is converted by the digital-to-analog converter 48 to the analog signal applied to the servo amplifier. The signal produced by the servo amplifier serves to speed up or slow down the servo motor momentarily to insure that the read/write head is properly synchronized (at the desired position and at the proper speed) at the appropriate time.

The frequency comparator 54 compares the signal indicative of the information storage disc speed with the one indicative of the head disc speed. The analog signal produced by the frequency comparator is indicative of the difference between the actual speed of the head disc 22 and its normal speed of precisely 2 times the recording disc 16 speed (nominally 80 r.p.s). This signal is applied to the servo amplifier in a sense tending to stabilize the system, that is, to prevent uncontrolled oscillations and reduce the hunting of the servo motor.

The principles and circuits involved in rate feedback are well known. In simple terms, the phase (position) signal and rate (velocity) signal are 90° out-of-phase with respect to each other. When the head position lags (for instance) the phase signal tends to accelerate the head motor and this minimizes the phase error. During the acceleration period, the rate signal amplitude increases and tends to decelerate the head motor to its normal speed. If the head phase error approaches zero while the head motor is still overspeeding the rate signal will tend to minimize overshoot, thus stabilizing the system. Similar stabilizing relationships exist when the head position momentarily leads.

The information read from or to be written on the disc 16 is available at lead 55. This lead may go through various gates to a shift register and from the latter to the main memory of a data processing system. These gates may be enabled when the analog signals on leads 58 and 60 are both near zero and when the binary number on cable 56 is also near zero. The near zero reading on lead 60 indicates that the relative speeds of the two discs are correct and within tolerance limits; the near zero reading on lead 58 indicates that the phase relationship between the two discs is correct and within tolerances; the near zero reading on cable 56 indicates that the desired track is in the read/write position.

Figure 6:
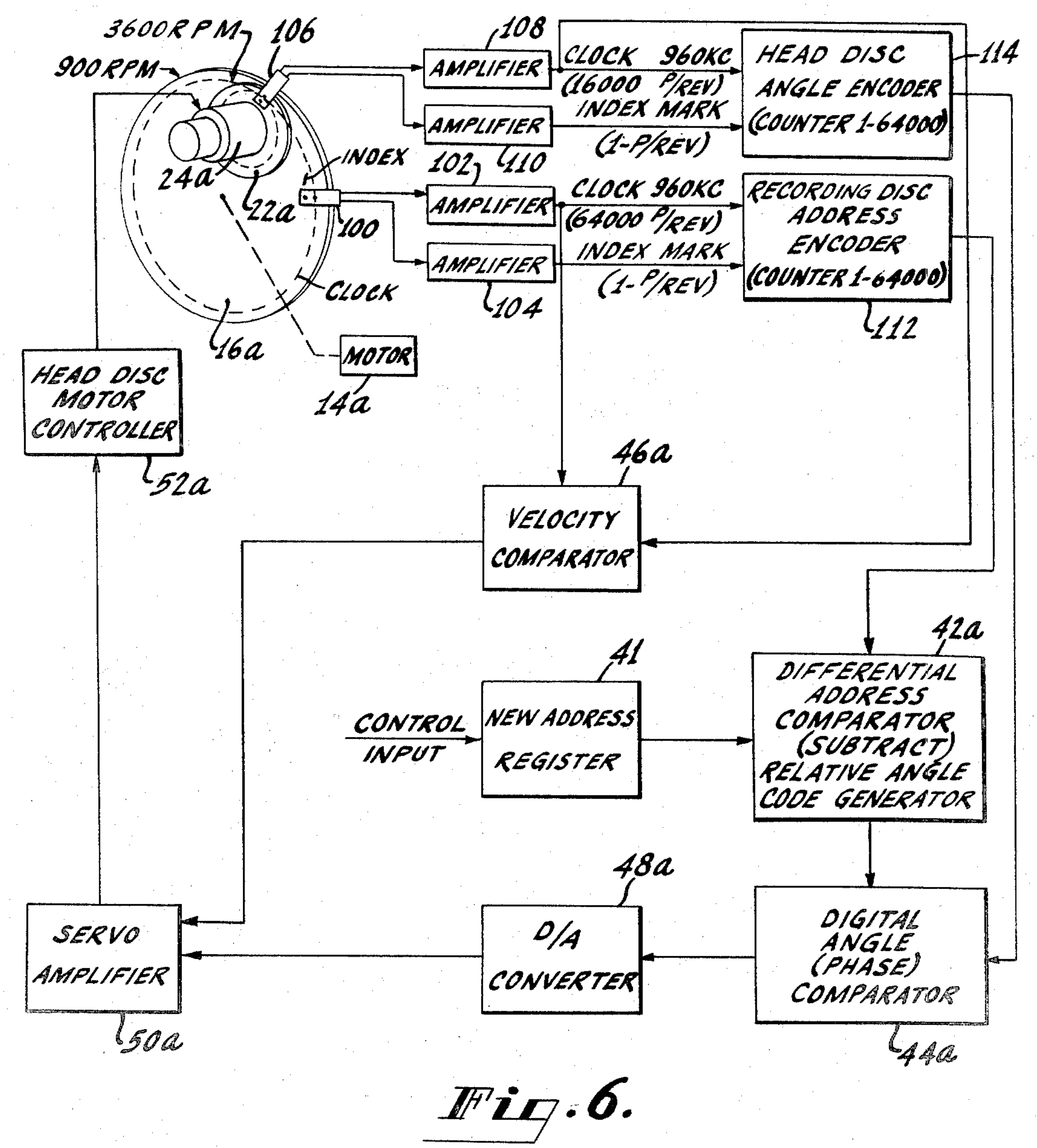
FIGURE 6 is a block diagram of another embodiment of a control system which is suitable for the disc memory system of the invention.

Another embodiment of a control system for the memory of the invention is shown in FIGURE 6. Elements similar in structure and function to the corresponding elements of FIGURE 2 are identified by the same reference numerals as the elements in FIGURE 2 followed by an *"a."*

Before discussing the details of this control system, it may be in order to discuss the parameters of the memory being controlled. The information storage disc **16*a* may be 24 inches in diameter and both sides of the disc may be useable. The motor 14a rotates the disc at a speed of 900 r.p.m. (15 r.p.s.). The tracks on the information storage disc are approximately 5 inches in length and may lie in a circular zone extending from a radius of about 8½ inches to a radius of about 11½ inches. The head disc 22a may be slightly larger than 5 inches in diameter and is driven by motor 24a** at a speed of approximately 3600 r.p.m. (60 r.p.s.).

There is a clock track and an index track on each disc. The clock track on the information storage disc has 64,000 clock marks recorded thereon and therefore produces 64,000 pulses each disc revolution (hereafter sometimes abbreviated $P/R$). The clock track on the head disc has 16,000 clock marks recorded thereon and therefore produces 16,000 pulses each head disc revolution. The index tracks on the respective discs each have one index mark and each disc produces one index pulse per disc revolution.

The clock and index pulses produced by the information storage disc 16a are picked up by heads 100 and applied to amplifiers 102 and 104, respectively. The clock and index pulses produced by the head disc are picked up by heads 106 and applied to amplifiers 108 and 110, respectively. Amplifier 102 produces output pulses at a frequency of 960 kc.

$$\left(64{,}000\frac{P}{R}\times 15\text{ r.p.s.}\right)$$

and amplifier 108 also produces an output at 960 kc.

$$\left(16{,}000\frac{P}{R}\times 60\text{ r.p.s.}\right)$$

The amplifiers 104 and 110 each produce 1 output pulse per disc revolution.

Amplifiers 102 and 104 are connected to address encoder 112 and amplifiers 108 and 110 are connected to head disc angle encoder 114. These encoders include counters, each capable of counting from 0 to 64,000. In addition, the encoder 114 includes means, such as a small counter, for producing one reset pulse for each 4 index pulses it receives. The counter of stage 112 is reset each time it receives an index pulse. Thus, the counter of encoder 114 is reset once each four revolutions of the head disc, that is, once each 64,000 pulses it receives, and the counter of stage 112 which is reset once each revolution of the information storage disc is also reset once each time it counts to 64,000.

The output produced by the counter 112 is a binary number indicative of the angular position of the information storage disc and of a track address. The output of the encoder 114 is a binary number indicative of the angular position of the head disc 22a. In addition, since the head disc makes 4 revolutions for each count of 64,000, the binary number produced by encoder 114 indicates the number of revolutions made (from 1 to 4) by the head disc from some reference position, for example, from its position at the time the information storage disc produces an index mark.

In a system such as shown in FIGURE 6, there may be 16,000 information storage tracks recorded on the information storage disc 16a. As the count of 64,000 corresponds to these 16,000 tracks, each fourth count may be employed to identify the center of a track. As already mentioned, these tracks may each be about 5 inches long giving a total track length of 80,000 inches. At a bit recording density of 2000 bits per inch, one side of the disc can record a total of $16\times10^7$ bits or $20\times10^6$ bytes (at 8 bits per byte). At the speeds given, the average access time is approximately 50 milliseconds.

The operation of the control system of FIGURE 6, aside from what has been discussed above, is quite similar to that of the system of FIGURE 2. The velocity comparator 46a compares the 960 kc. signal derived from the head track with the 960 kc. signal derived from the information storage disc, in a manner similar to that discussed in connection with stage 46 of FIGURE 2. The address comparator 42a compares the binary number indicative of the position of a track on the information disc with a binary number supplied by the new address register 41 which indicates the track it is desired to access. The remaining stages are similar in structure and function to those already discussed in connection with FIGURE 2.

In the arrangement of FIGURE 2, there is a single read/write head 20 mounted in the head disc 22. The relative speeds of the head disc and the information storage disc may be such that the read/write head writes on and reads from successive, adjacent tracks on the disc. As an alternative, the relative speeds may be such that the reading and writing occurs on interlaced tracks. For example, during one revolution of the information storage disc, the read/write head 20 may read information from or write information on only the 1st, 6th, 11th and 16th and so on tracks; in the second revolution of the disc the read/write head 20 may write on or read from the 2nd, 7th, 12th, 17th tracks and so on. In a system of this type, it takes five disc revolutions to write information on or to read information from the entire disc.

The speed ratio between the information storage disc and the head disc which is selected depends upon the specific application involved. Some of the design parameters which must be considered include: the data transfer rates desired; the access time desired; the speeds the motors are capable of delivering; the relative sizes of the discs; the centrifugal forces generated by the discs and so on, and so on.

In conventional disc recording, the head is in contact with the recording surface. As a general proposition, when two objects such as these are in contact with each other, and relative motion takes place (especially high speed relative motion, as is normally encountered in magnetic recording applications), a dry or lubricating bearing relationship exists. This relationship involves wear of both objects; in this case, the magnetic recording head and the recording medium. The condition of the surface of the recording medium and the recording head is extremely critical in high density recording applications and therefore this physical contact is undesirable.

In the arrangement of the present invention, the preferred type of lubrication between head and disc is "air lubrication." While the gas molecules may be in contact with both surfaces, that is, with the head and the recording surface, wear is infinitesimal and the probability of maintaining good surface conditions is high. The preferred type of head to employ is shaped to act like a sled, creating an aerodynamic film which exerts pressure on the head, tending to move it away from the recording surface. The desired head to disc spacing is maintained through a counter force consisting of 2 major components: a mechanical spring pressure tending to keep the head away from the disc; and a centrifugal force component in a direction forcing the head against the disc (generated by the rotating motion of the head disc).

Air floated lubrication heads of the type discussed generally above are known and described in many issued patents. Accordingly, they need not be discussed in further detail here.

Figure 4:
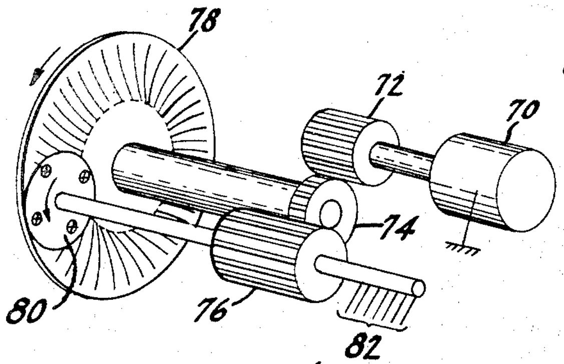
FIGURES 4 and 5 are schematic showings of other embodiments of a disc memory system according to the invention.
Figure 5:
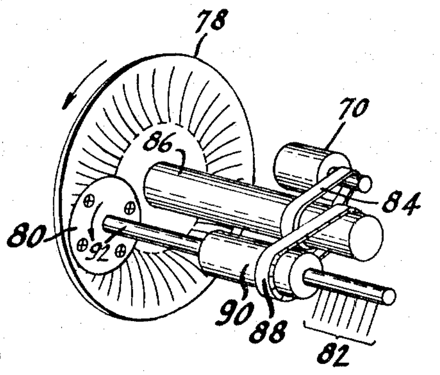

In view of the air floatation of the head, it is preferred in the present invention that the head disc not extend beyond the outer edge of the information storage disc. With air floated head or heads, if the head disc were extended beyond the recording disc outer edge, there would be practical problems to overcome involving interrupted dynamic air floatation films. While these problems may not be insolvable, for magnetic recording applications, in the interest of maintaining simplicity, the arrangement illustrated both in FIGURE 1 and in FIGURES 4 and 5 is more desirable.

It is to be understood that the present invention, while described in terms of magnetic recording, is not limited to this application. As one example, the information may be optically recorded on a transparent or semitransparent information disc and the transducer employed a photocell or a light guide such as a fiber optics bundle leading to a photocell. In an arrangement of this type, the spacing problem between the transducer and the surface of the storage medium is not as critical and it therefore becomes more practical to permit the head disc to extend beyond the edge of the information storage disc. In all applications, however, the shaft of the head disc should be positioned between the center of the information storage disc and the circumferential edge of the storage disc.

Rather than employing a single read/write head one can instead employ multiple heads on the disc. A schematic arrangement of one form of a head disc of this type appears in FIGURE 3. There are 4 heads **20*a*–20*d*** equally spaced around the disc circumference. (The identification codes, although present, are not shown.) With an arrangement of the type shown in FIGURE 3, switching means may be employed to switch from head to head in succession. This makes it possible to increase the operating speed (higher average transfer rates and faster access times) of the disc storage system of the invention, however, a somewhat greater amount of electronic equipment is required to be able to switch from head to head. The total number of heads which can be employed depends upon many design parameters including the relative rotational speeds of the two discs, the relative sizes of the two discs, the length of the tracks which store information and so on, and so on.

A preferred speed ratio for the arrangement of FIGURE 3 is 1:1 when it is desired to record serially (4 equally spaced tracks per revolution of the recording track). At higher ratios, for example, 2 revolutions of the head disc to one revolution of the information storage disc, 8 tracks will be recorded for each revolution of the recording track. Here staggered simultaneous inputs to or outputs from consecutive heads may be employed. As an alternative, a single input output may still be employed, and in this case, the advantage of the multiple head configuration is faster access time due to the shorter rephasing time to the nearest head. In other applications, the multiple head configuration may be employed to record an essentially continuous record with head-to-head switching almost instantaneously.

Another form of disc memory system, according to the invention, is shown in FIGURE 4. A drive motor 70 is coupled through a gear train 72, 74, 76 (belts may be used instead) both to the information storage disc 78 and the head disc 80. The head disc is shown to include 4 magnetic heads, however, other alternatives such as a single head are possible. The signals may be supplied to or received from the head or heads by means of signal and control slip rings which connect to conductors leading to the heads. These are shown schematically at 82. As an alternative, a rotary coupler may be employed.

In the arrangement of FIGURE 4, the gear ratio may have a value which is not an integral number. For example, the gear ratio may be slightly higher or slightly lower than a 1:1 ratio in which case the recorded tracks will be laid down in an interlaced pattern. This pattern covers the entire disc after several revolutions of the information storage disc and consists of tracks which are equally spaced from one another. Thereafter, the recording heads retrace the same tracks over and over again in a similar fashion.

An important feature of the memory of FIGURE 4 is its simplicity and low cost. It is useful in a number of applications as, for example, low cost index searching.

The embodiment of FIGURE 5 includes a motor 70, information storage disc 78 and head disc 80 all analogous to the like numbered components of the arrangement of FIGURE 4. The motor is coupled via a belt 84 to the shaft 86 for the information storage disc. Shaft 86 is coupled via a timing belt 88 to a step motor 90 which is on the shaft 92. (Gears may, of course, be used instead of the belts). The shaft 92 is fastened to the head disc 80. The step motor 90 normally rotates with the shaft 92, however, in response to an input command, the step motor causes the shaft 92 to rotate with respect to the motor casing 90 through a desired angle.

In the configuration of FIGURE 5, the belt ratio is such that the information storage track 78 and head track 80 rotate at speeds which are integral multiples of one another. For example, the speed ratio may be 1:1 for the configuration shown. With an arrangement of this type, the same tracks are traced by the recording heads over and over again until a control signal is applied to the step motor. This signal causes the motor to "step" through a small angle, thereby changing the relative phase of the two shafts 86 and 92 just sufficiently to record or read from another group of tracks immediately adjacent to the original group. Track selection may be accomplished directly, by the computer associated with the disc memory, based on the number of steps necessary to go from a previously known address to any desired new address.

An important feature common both to the arrangements of FIGURES 4 and 5 is that track selection codes need not be recorded separately on the information storage discs. Instead, track identification may be included with the data. Moreover, for many applications, elaborate control circuits are not required since, in the case of FIGURE 4, the two discs are locked in a fixed relationship and, in the case of FIGURE 5, the instantaneous phase relationship between the two discs readily can be determined simply by keeping track of the number of steps imparted by the step motor.

In the various memory systems described above, the information storage disc speed is relatively constant and the head disc speed can be changed to bring it into proper phase relationship with the storage disc speed. There are some applications, on the other hand, where it is preferable to maintain the velocity of the head disc relatively constant and to control the velocity of the information storage disc. For example, for large speed ratios where the recording disc revolves relatively slowly while the head disc revolves at very high velocity, more economical control or faster access times may be possible through control of the slower disc.

In the various arrangements described above, one or more transducers are mounted on a single head disc. It is possible also to employ multiple head discs, each with one or more heads. In this type of arrangement, parallel readout (and read in) is possible.

In the simplified control arrangement described above and shown in FIGURE 6 the head disc angle encoder and recording disc address encoder are reset only once per revolution of the recording disc. In applications where the shortest possible access time is desired both encoding counters may be reset once per revolution of the head disc, on the count of 16,000. In addition to the above mentioned clock track and index track on the recording disc, a second synchronous clock track with four equally spaced marks may be recorded. Pulses from the added track may be used to reset the 16,000 mark counter four times per revolution of the recording disc and drive an additional two stage binary counter to provide identification of the quadrants. The combined output of the two counters identifies $4\times16{,}000=64{,}000$ unique positions on the recording disc and both counters may be reset simultaneously once per revolution of the recording disc.

What is claimed is:

1. A memory system, comprising, in combination;
   a storage disc;
   means coupled to the disc for rotating the same about its axis;
   a second disc arranged adjacent and parallel to the storage disc and having an axis of rotation which is located between the axis of rotation of said storage disc and the outer edge of said storage disc;

a transducer mounted in a fixed relationship to the second disc and in operating relationship with the storage disc; and means coupled to the second disc for rotating the second disc for causing the transducer to follow curved paths along the storage disc.

2. A memory system as set forth in claim 1 in which the transducer is mounted on the second disc.

3. A memory system as set forth in claim 1 in which the storage disc is a magnetic storage disc and the transducer is a magnetic head.

4. A memory system as set forth in claim 1 in which the diameter of the second disc is smaller than that of the storage disc and in which the outer edge of the second disc does not extend beyond the outer edge of the storage disc.

5. A memory system as set forth in claim 1 in which the two discs are driven by separate motors, and further including means for adjusting the speed of one of the motors with respect to the other.

6. A memory system as set forth in claim 1 in which the storage disc is driven at a speed which is substantially lower than that of the second disc.

7. A memory system as set forth in claim 1 in which a single drive means is coupled to and drives both discs.

8. A memory system as set forth in claim 7 in which said single drive means drives the two discs at speeds which are not integrally related to one another.

9. A memory system, comprising, in combination;

a storage disc;

means coupled to the storage disc for rotating the same about its axis;

a second disc having a diameter not greater than the radius of the storage disc arranged adjacent and parallel to the storage disc, and located entirely between the center and the circumferential edge of the storage disc;

a transducer mounted in the second disc closer to its circumferential edge portion than its center and arranged in operating relationship with the storage disc;

means coupled to the second disc for rotating the second disc about its axis for causing said transducer to follow curved tracks along the storage disc;

track identification indications on said storage disc arranged adjacent to said curved tracks; and transducer means in fixed position relative to the storage disc for reading out said track identification indications.

10. A memory system as set forth in claim 9 in which said curved tracks lie in a circular zone surrounding the center of the storage disc, having a width substantially smaller than the radius of the storage disc, and lying close to the storage disc circumference.

11. A memory as set forth in claim 10 in which said tracks are of generally spiral shape.

12. A memory system as set forth in claim 9, further including position identification indications near the outer edge of the second disc; and transducer means in fixed position relative to the second disc for reading out said position identification indications.

13. A memory system as set forth in claim 12, further including a control system responsive to an input address and to the track identifying indications for producing an output indicative of the storage disc position, means responsive to said output and to the position identifying indications for producing an output indicative of a difference in phase angle between the storage disc and second disc, and said control system being responsive to said last-named output for adjusting the difference in relative angular position and speed between the two discs.

14. A memory system as set forth in claim 12, further including means coupled to the transducer means of claim 12 for regulating the speed of one of the discs relative to the other.

15. A memory system as set forth in claim 14, further including means coupled to the transducer means of claim 9 for controlling the phase of one disc with respect to the other.

16. A memory system, comprising, in combination;

a storage disc;

means coupled to the disc for rotating the same about its axis;

transducer supporting means having an axis of rotation which is parallel to but not coincident with that of the storage disc and which lies between the axis of rotation and the outer edge of said storage disc;

a transducer mounted to the transducer supporting structure and located close to the storage disc surface; and means coupled to said transducer supporting means for rotating the same for driving the transducer along a circular path in a plane parallel to the storage disc and lying in its entirety between the center and the outer edge of said storage disc.

17. A memory system, comprising, in combination;

a storage disc having an axis of rotation;

a second disc arranged adjacent and parallel to the storage disc and having an axis of rotation which is not coincident with that of the storaged disc;

a transducer mounted in fixed relationship to the second disc and in operating relationship with the storage disc;

a single drive means coupled to both of said discs for rotating the two discs at speeds integrally related to one another for causing the transducer to follow curved paths along the storage disc; and means coupled to one of said discs for changing its phase relative to that of the other disc.

18. A memory system, comprising, in combination;

a storage disc having an axis of rotation;

means coupled to said storage disc for rotating the same about its axis;

a second disc arranged adjacent and parallel to the storage disc and having an axis of rotation which is not coincident with that of the storage disc;

a transducer mounted in fixed relationship to the second disc and in operating relationship with the storage disc;

means coupled to said second disc for rotating said second disc for causing the transducer to follow curved paths along the storage disc;

track identification indications, one set of such indications for each track, located on said storage disc for identifying said curved paths on said storage disc; and transducer means, in fixed position relative to said storage disc, located adjacent to said storage disc, for detecting said indications.

19. A memory as set forth in claim 18, further including disc position indications near the outer edge of said second disc for indicating the position of the second disc, and transducer means adjacent to the second disc for detecting said indications.

References Cited

UNITED STATES PATENTS 3,334,193 8/1967 Dow ............. 179—100.2

OTHER REFERENCES

Eastwood, D.E.: "Stacked Disk Recorder," IBM Technical Disclosure Bulletin, vol. 4, No. 1, June 1961, p. 12.

BERNARD KONICK, *Primary Examiner.*

A. I. NEUSTADT, *Assistant Examiner.*